United States Patent [19]
Brindle et al.

[11] Patent Number: 5,475,801
[45] Date of Patent: Dec. 12, 1995

[54] SYSTEM FOR CONTROLLING THE PRINTING OF ELECTRONIC DOCUMENTS WITH VARIOUS PAGE DESCRIPTION LANGUAGES AND OTHER PARAMETERS

[75] Inventors: Edward E. Brindle; John C. Czudak, both of Webster; Charles Willette, Fairport; Jehoiada Bernard, Webster; Charles R. Nail, Rochester; Michael L. Campanella, Webster; Samuel A. Fedele, Rochester; Gregory R. Tellex, Victor, all of N.Y.

[73] Assignee: Xerox Corporation, Stamford, Conn.

[21] Appl. No.: 898,112

[22] Filed: Jun. 12, 1992

[51] Int. Cl.⁶ ..................................................... G06F 15/00
[52] U.S. Cl. ............................................... 395/114; 395/112
[58] Field of Search ............................... 395/114, 112, 395/110, 163, 164, 165, 101, 115, 116, 500, 375, 200, 800, 113, 145, 166, 117; 358/404, 444, 406, 504; 346/154; 400/61, 76, 62; 355/200, 201, 202, 203, 204, 205, 206, 207, 208, 209; 347/19; 380/51

[56] References Cited

U.S. PATENT DOCUMENTS

| | | | |
|---|---|---|---|
| 4,833,596 | 5/1989 | Buckland et al. | 364/200 |
| 4,920,481 | 4/1990 | Binkley et al. | 364/200 |
| 5,050,098 | 9/1991 | Brown, III et al. | 395/112 |
| 5,075,874 | 12/1991 | Steeves et al. | 395/112 |
| 5,220,674 | 6/1993 | Morgan et al. | 395/110 |
| 5,303,336 | 4/1994 | Kageyama et al. | 395/114 |
| 5,333,246 | 7/1994 | Nagasaka | 395/163 |

OTHER PUBLICATIONS

Deitel, H. M., "An Introduction to Operating Systems", Revised Edition, Addison–Wesley Publishing Co., 1984, pp. 169, 171, 485–488, 494, 512, and 582–584.

Primary Examiner—Raymond J. Bayerl
Assistant Examiner—Dov Popovici
Attorney, Agent, or Firm—R. Hutter

[57] ABSTRACT

In a network wherein a plurality of independent computers having various page description languages (PDL's) interface with a central printer through a plurality of lines, a system allows the user or administrator of a computer on each line to elect whether the line shall have the property of persistence of a PDL for all jobs coming through the line, or whether a new PDL shall be activated as necessary depending on the particular line.

11 Claims, 7 Drawing Sheets

SYSTEM FOR CONTROLLING THE PRINTING OF ELECTRONIC DOCUMENTS WITH VARIOUS PAGE DESCRIPTION LANGUAGES AND OTHER PARAMETERS

Cross-reference is made to the following patent applications, both assigned to the assignee of the present application, and incorporated herein by reference: Ser. No. 07/752,146, filed Aug. 29, 1991, for "Print Manager System for Electronic Job Printing;" and U.S. Pat. No. 5,226,112, issued Jul. 6, 1993, for "A Method for Translating a Plurality of Printer Page Description Languages," being filed simultaneously herewith.

The present invention relates generally to interpreting jobs written in one of a plurality of page description languages for printing with a printing apparatus, and more particularly to a technique for controlling interpretation files within a printing apparatus server to prevent unwanted interaction and interference among multiple interpreters therein.

Personal computers have become commonplace on the desks of most office workers. Typically, much of the work product of such computers is intended to be transformed into hardcopy via a printer using digital imaging technology. A typical printer configuration for this purpose comprises a dedicated printer coupled to the personal computer ("PC"). However, printers used for this purpose are typically small laser printers which have limited functions and features such as a limited tray capacity which restricts the number and types of copy sheets that can be used to make prints on, or which do not have a finishing capability, etc. More importantly small laser printers also typically handle only one page description language.

On the other hand, larger high speed laser printers normally have a great deal of finishing and copy sheet capability which would allow the PC user to have, for example, custom printing and finishing of his work product, an option which for many PC users would be highly desirable. In practice, the PCs can be used advantageously with a network printing system of the type combining a number of client inputs, such as the PCs, or the like, and one or more printer outputs. In one example of such network printing systems, a client at one of the inputs sends electronic documents that comprise a job over a local area network (LAN) to one of the printers selected for printing of the job. In particular, LANs provide a means by which users running dedicated processors are able to share resources such as printers, file servers and scanners. Integration of shared resources has been a problem addressed by LAN managers. LAN managers have made different network protocols such as Ethernet and Token Ring transparent to devices running different network protocols. LANs also have a variety of print drivers emitting different page description languages (PDLs), which are directed to specific printer devices.

A PDL is a method of describing printed page(s) in a printer independent format. No one standard PDL presently exists, and as a result a number of industry standards have emerged. A PDL establishes an interface between a print driver or client and a print server or printer. Currently existing PDLs include PostScript® ("PS"), Hewlett Packard Printer Control Language ("HP-PCL") and Interpress Page Description Language. Documentation regarding these three languages can be found in the following references, the pertinent portions of which are incorporated herein.

PostScript® Language Reference Manual

Second Edition

Addison-Wesley Publishing Co.

1990

PCL 5 Printer Language

Technical Reference Manual

First Edition

Hewlett Packard Co.

1990

Harrington, S. J. and Buckley, R. R.

Interpress: The Source Book

Simon & Schuster, Inc.

New York, N.Y.

1988

Xerox® Corporation is presently marketing a server for a printing apparatus, the server being referred to as the "Docutech™" Network Publisher model 135 and derivative products (Docutech is a trademark of Xerox Corp.) This server is adapted to translate a job written in a first PDL, such as PS or HP-PcL, into a second PDL, such as Interpress, for printing of the job on a Xerox® compatible printing apparatus. At the heart of the server are two interpreters, one of which is adapted to translate PS and the other of which is adapted to translate PCL. Each interpreter contains software, written by either Adobe® Corp. or Peerless® Corp. to facilitate the translation process. Other imaginal data interpreters may be used as well.

In the area of data processing systems it is known that a coprocessor can be employed to assist a main processing unit to perform some of the more time consuming data processing tasks. The following two references are examples of arrangements in which a host system is used advantageously in conjunction with a coprocessor:

U.S. Pat. No. 4,833,596

Patentee: Buckland et al.

Issued: May 23, 1989

U.S. Pat. No. 4,920,481

Patentee: Binkley et al.

Issued Apr. 24, 1990

The operation of a data processing system having a main storage area with an operating system can be further enhanced by a technique referred to as swapping. As is known, in AT&T's UNIX® operating system processes are swapped to and from secondary storage as neededd, thereby enabling a single computer CPU to be used simultateously by a number of users each running some unique application program. As discussed by the following reference, systems exist in which core images can be swapped in and out of main storage in accordance with user demands.

Deitel, H. M.

An Introduction to Operating Systems

Revised First Edition

Addison-Wesley Publishing Co.

1984 pp. 169, 171,485–488,494, 512 and 582–584

In networked systems, in which several users at various work stations are sharing a single printer, a desirable feature is that each workstation (i.e., each user) will see the central printer as "dedicated" to that user. In other words, when a user calls up the central printer to print a job, the user wants the same service it would get as if it were the only workstation connected to the printer. In fact, most printer interfaces used on personal computers are designed to operate in such a situation where a one-to-one relationship between the workstation and the printer exists. A user does not want to see any delays or ever caused by unwanted interaction of his job with a job from another user going into the central printer at generally the same time. Further, an important customer requirement is that a central printer be able to receive image data from a variety of PDLs. As mentioned above, two common types of PDLs are PostScript or HP-PCL. The companion application to the present application, attorney docket number D/92186, discloses one possible system for adapting a central printer to employ the appropriate PDL for a particular incoming job.

In networked printing systems which are currently practical, the PDL associated with a particular user on the system will be "persistent" on a line through which data passes to the printer; i.e. a font or form may be loaded only once and is used by subsequent jobs. That is, the selected PDL for one incoming line will usually be the same appropriate PDL as that used in the previous job coming through that particular line. Generally, this is a desirable situation, because the typical user ordinarily does not change his PDL from job to job. It is more convenient simply to retain a single PDL for the various jobs being sent to the printer. If the PDL is changed for a particular line used by one user or class of user, generally the change in PDL will be persistent and the central printer will expect all subsequent jobs on that line to be in the new PDL. It is part of the nature of microprocessors currently available that registers associated with a line left in one configuration after a job is executed in a certain PDL will simply remain in that configuration, in the absence of specific intstructions to the register to reconfigure for a different PDL in a subsequent job. A problem arises, however, when jobs requiring different PDLs are sent to the printer through the same line, as when more than one user accesses the same line. If user A, for example, sends a job to the printer in PostScript, that line will be left in the PostScript PDL after the job is done. Thus, if user B subsequently uses the same line for an HP-PCL job, a major error or inconsistency may result because of the fundamental difference of the instructions between the two PDLs.

Other fundamental parameters of a printing job tend to be made persistent in the use of networked printing. Among these other parameters which tend to remain on a given line regardless of subsequent users are: font substitutions (whether, if the desired font is not available, to substitute another default font, or to cancel the job or etc.); the resolution of the desired image; the available set of half-tone screens or algorithms; any of a variety of schemes for error flagging (if an error appears in the program, whether to return an immediate message, print out the defective document none the less, or simply to cancel the job); or, the provision of fixed time limits in which the printer may be monopolized for a single job (e.g. a job can be set to cancel after a predetermined number of minutes). All of these fundamental parameters by which the printers accepts electronic data for a remote user may also come under the heading of the "PDL." The PDL itself is one dimension of a broader concept, that of a "context" of a line for data sent to a printer. Generally, the "context" comprises the PDL, the actual data being translated by the processor, and the configuration of registers through which the data enters the processor. All of these options may cause serious errors or crashes if they are treated in an inconsistent manner in subsequent jobs sent through the line, or at the very least, will interfere with the desired fiction of total independence of each user sending jobs to a central printer.

It is an object of the present invention to provide a system by which users of a central printer may retain the option of using various PDLs or other printing parameters without interfering with subsequent jobs from other lines using the same central printer. The non-interference property is preferably retained as a user option because in some instances persistence of some printing parameters is in fact desired. However, with the present invention, an independent user may have the option of sending a job on a "sanitary" line to the printer, in which the specific printing parameters (the "context") of the job cannot interfere with, or be interfered by, other jobs that have been sent on that line or any other line to the printer or will be sent in the future.

In accordance with the present invention, there is provided a system for transferring printing jobs comprising digital image data from a user through a line to an electronic printer for execution therein, the line having associated therewith a context comprising a program parameter relating to the processing of the digital image data by the printer. Processor means operatively associated with the line translate a printing job having a preselected context into a form understandable by the electronic printer. The processor means include a set of selectable memory maps, each memory map having a sequence of instructions to translate a job having a selected program parameter. Persistency means are associated with the line, to retain a context of a line as a result of a previously-executed job, and cause the processor means to translate a subsequent job passing through the line according to the retained context. State selection means associated with each line can be activated to cause the persistency means not to retain the context of a line after the processor means translates the printing job.

These and other aspects of the invention will become apparent from the following description, the description being used to illustrate a preferred embodiment of the invention when read in conjunction with the accompanying drawings.

Figure 1:
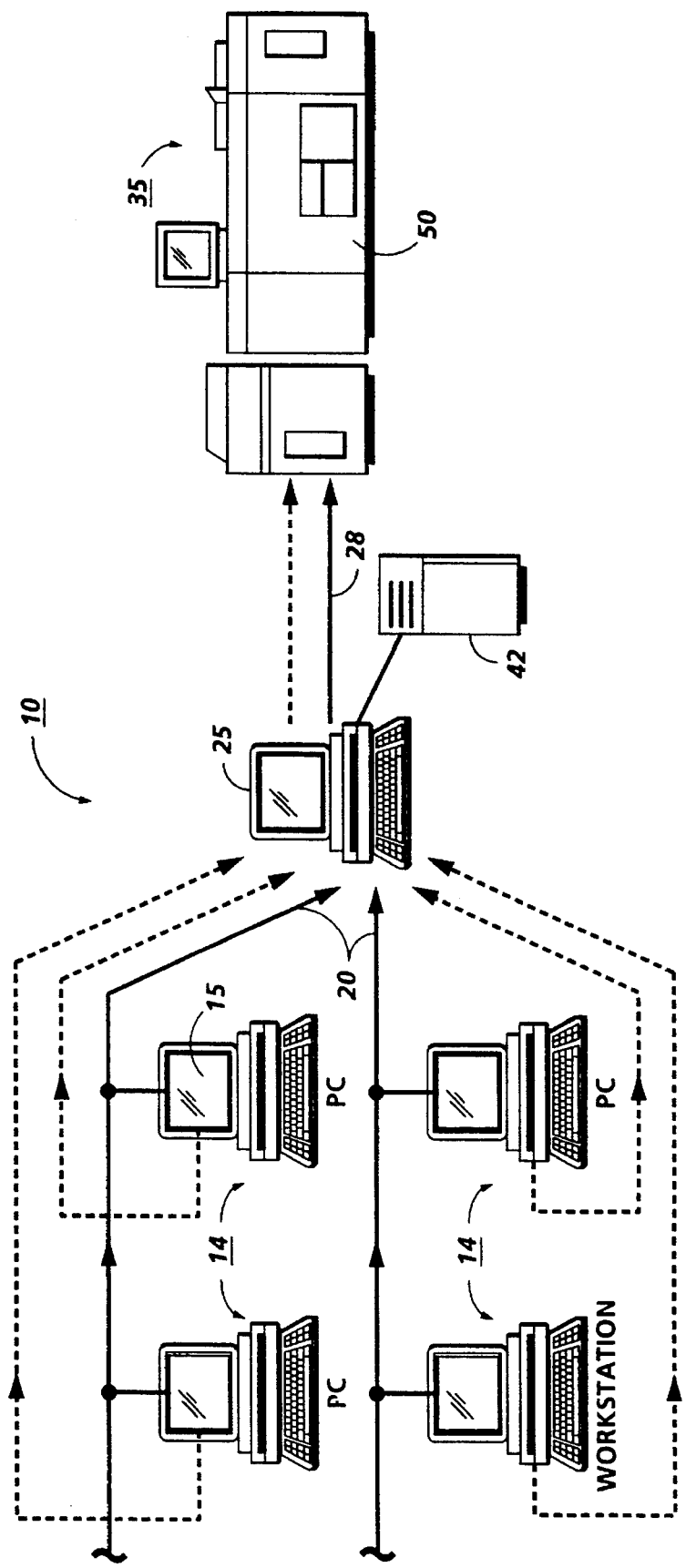
FIG. 1 is a schematic view of a printing arrangement including a plurality of client workstations interfaced with a printing apparatus by a server.

Referring to FIG. 1, there is shown a printing arrangement, designated generally by the numeral 10. The printing arrangement 10 includes a plurality of remote inputs such as PCs, workstations, etc. (referred to herein as workstations 14), coupled via one or more lines 20 to a server 25. Workstations 14 include a CRT type display screen 15 together with keyboard and mouse for entering programming instructions, image data, etc. Screen 15, which may be a touchscreen, displays various job program choices, operator instructions, messages, etc. The server 25 is, in turn, coupled through one or more networks 28 to one or more printing systems 35.

Figure 2:
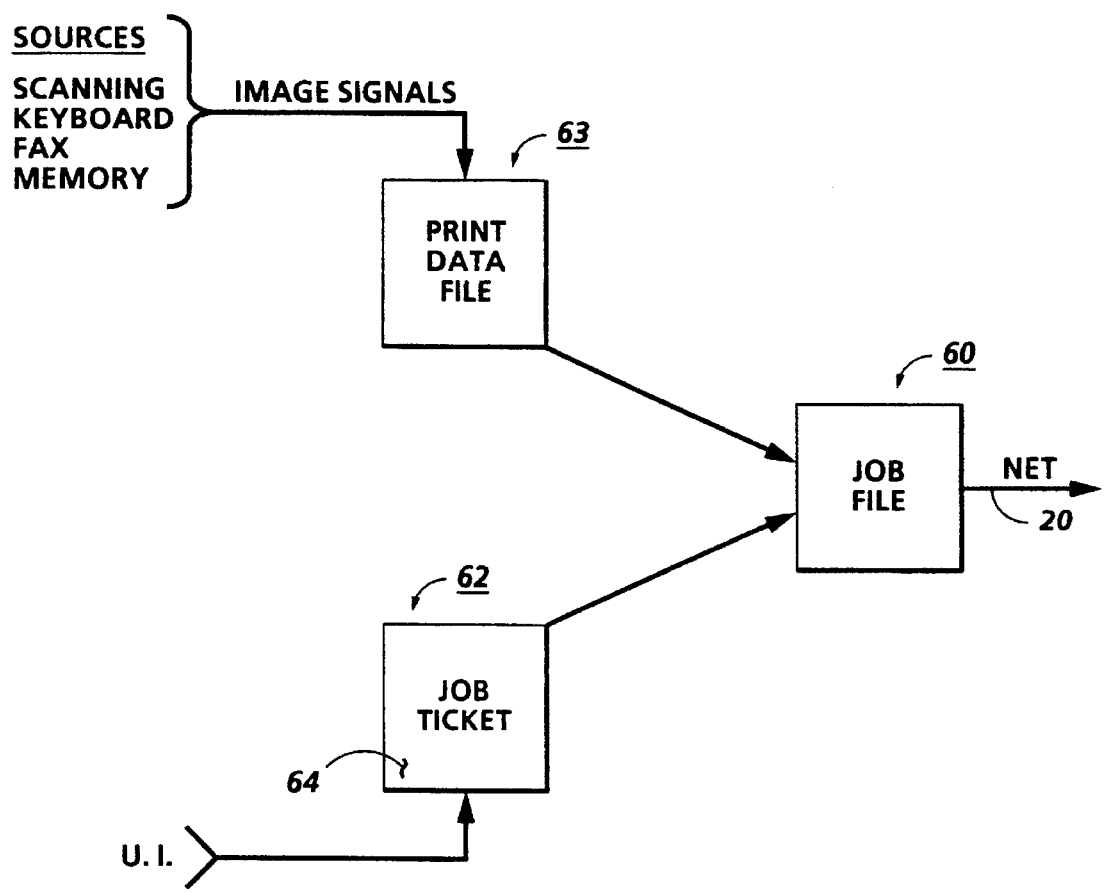
FIG. 2 is a schematic view of a job file and the contents thereof.

Referring to FIG. 2, electronic job files 60, or parts thereof, are created at the individual workstations 14, each job file comprising a Job Specification 62 and Print Data file 63, expressed in a PDL. Job Specification 62 is in the form of a job ticket 64 having instructions for routing, handling, and processing the job 62. As will be clarified from the discussion below, in the preferred embodiment of the present invention, the PDL of print data file 63 is either written in Postscript® ("PS") or Hewlett Packard Printer Control Language ("HP-PCL") or other imaginal data. The jobs in Print Data file 63 are electronic in form, consisting of image signals or pixels generated, for example, by scanning hard copy documents and converting the document images to image signals or pixels, directly by a keyboard, taken from memory, or consisting of page format and/or graphic output commands all encoded in one of the preferred PDL encodings. The content of the job files are normally compressed to increase bandwidth and reduce the amount of storage required. The image signals, pixels, or PDL instructions in Print Data File 63 are arranged as electronic documents or pages for printing on a print media such as paper stock or sheets.

The server 25 comprises any suitable interface for receiving job files 60 from workstations via a network comprising a plurality of lines 20a, 20b ... 20n, with the ability to access and decode the job processing instructions on the accompanying job ticket. The server 25 preferably includes an on-board memory of suitable capacity for temporarily storing the job files pending processing thereof by printing system 35. The print manager on-board memory may be large enough to support long term storage of the job files or parts of the job files. Alternately, one or more remote memories 42 may be provided for this purpose.

The printing system 35 may include one or more high speed electronic printers 50 for processing jobs in accordance with the instructions input through the job ticket accompanying each job file. While a single printer 50 is shown, plural printers, either at a single central location or at several remote locations may be envisioned. Printer 50, for example, may be a xerographic based printer of the type shown and described in U.S. patent application Ser. No. 07/589,941 entitled "Electronic Printing System for Printing Signatures," the pertinent portions of which are incorporated herein. In other contemplated implementations of the preferred embodiment, the printer 50 could comprise other known printer types such as ink jet, ionographic, LED, and the like.

Figure 3:
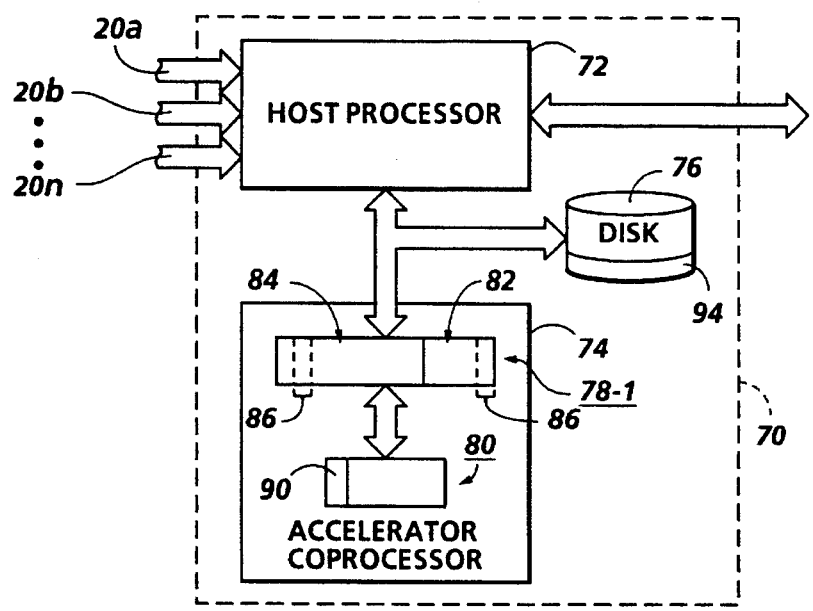
FIG. 3 is a schematic, block diagrammatic view of the server and the printing apparatus used to implement the technique of the present invention.

Referring to FIG. 3, the structure of the server 25 is discussed in further detail. The interpreter 70, which is located within server 25. includes a host processor 72, an accelerator coprocessor (ACP) card 74 and a disk storage device 76. The host processor 72 includes means for accepting incoming printing jobs from any one of the network lines 20a, 20b, ... 20n, as shown. Systems for polling the various lines 20a, 20b, ... 20n for incoming jobs, such as with "round-robin" polling, are well-known in the art. In one example, the host processor is an IBM PC-AT system having an Industry Standard Architecture (ISA) or an Extended Industry Standard Architecture (EISA) bus to accept the ACP card. The host processor 72 can be configured for operation in a network environment. When the host processor 72 is configured for network operation, it is preferably Novell™ certified for Netware 386™.

In the preferred embodiment, the ACP card 74 comprises the following major blocks:

80960CA Microprocessor

Host System ISA Interface

Extended Bus Interface

Memory (16 MBytes)

Programmable Read Only Memory

Timer/Counter

256 Byte Board Identification EEPROM

The host processor 72 is capable of transferring data to and from ACP memory through a 128K byte sliding shared memory window. The ACP 74 also can use a small section of the host processor's IO address space. By writing to an IO data port of the ACP 74, the host processor 72 is able to send commands to the ACP 74. In turn, by reading the IO data port, the host processor 72 is able to receive acknowledgement messages back from the ACP 74. These messages are typically 1 byte in length and are used to synchronize the actual data transfers in shared memory. In the preferred embodiment, two 8 bit data ports are used to communicate synchronizing swap requests and acknowledgements between the ACP 74 and the host processor 74 prior to the actual transfer of PDL decomposer code and font cache data.

Figure 4:
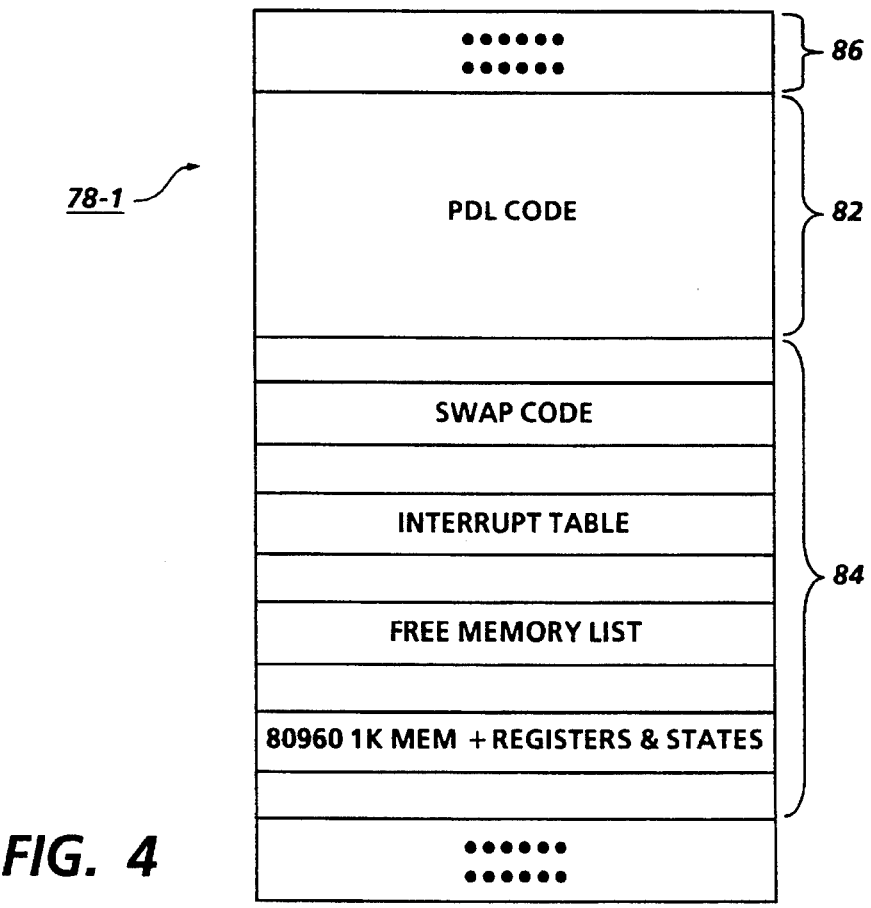
FIG. 4 is a schematic view of a context file, i.e., a sequence of instructions, employed to translate page description language contained in the job file.

Referring still to FIG. 3, the ACP card 74 is shown with a memory map 78-1, which includes all of the software necessary to interpret a page description language, and the 80960CA microprocessor, the microprocessor being designated by the numeral 80. Referring to FIG. 4, the memory map 78-1, which includes a user section 82 and a system section 84, is shown in greater detail. The memory map 78-1 further includes a section 86 having registers through which the HPDR and the PHDR can communicate and a status flag can be set.

In the illustrated embodiment of FIG. 4, the user section 82 comprises a section for retaining PDL interpretation code, the PDL interpretation code being adapted to facilitate the interpretation of a job file expressed in a first PDL, such as Interpress, PS or HP-PCL. In the preferred embodiment, the PDL interpretation code is written by either Adobe® Corp. or Peerless® Corp., in conjunction with Xerox® Corp., for use by Xerox® Corp. in its Docutech™ Network Publisher ("Docutech" is a trademark of Xerox® Corp.). tt should be understood that the PDL interpretation code facilitates translation of the job file 60 from a first PDL, such as PS or HP-PCL, into a second PDL file, such as Interpress. Those skilled in the art will appreciate that such translation could be, in one example, achieved by using a configurable PDL interpreter, such as one manufactured by Adobe® Corp. or Peerless® Corp to reduce the text and graphics of the job file 60 into a bitmap and then to express the bitmap in the form of a second PDL.

It should be appreciated that only selected portions of the system section 84 are shown. Much of the software for the section 84 simply serves as one of various approaches for implementing the processes illustrated in FIGS. 5A–5C, the significance of which processes will be discussed in further detail below. It will be recognized by those skilled in the art that, in practice, various software tools, such as tables, e.g., fault, system procedure and control tables, timers and controls therefor, control implementations, storage locations, stacks and debuggers would typically be employed in to implement the system section 84.

Referring to FIGS. 3 and 4, the microprocessor 80 includes a section 90 which contains information regarding the internal state of the microprocessor 80, such information including 1K memory, registers and states. This information can be selectively stored in a layer of the system section 84. The specific sections and functions of memory map 78-1 are given in patent application Attorney Docket No. D/92186, being filed simultaneously herewith.

Referring specifically to FIG. 3, both the host processor 72 and the ACP 74 are coupled with the disk drive device 76 so that, as explained in further detail below, portions of the memory map 78-1 can be transferred, in the form of a context file, thereto. Preferably, at any one moment, one or more PDL context files, designated by the numeral 94, are stored in the disk drive 76. Upon processing a job file 60, the interpreted PDL file can be transmitted to one of a plurality of output or printing devices. In the preferred embodiment, the interpreted PDL file is expressed in Interpress, and is transmitted to the printer 50 which comprises a decomposer 96 and an image output terminal (IOT) 98. In one example, the decomposer 96 is of the type used in a Xerox® 4045 ("Xerox 4045" is a trademark used by Xerox®) printer and employs software of the type described in Interpress: The Source Book. Additionally, the IOT can be any suitable print engine, such as the Docutech™ print engine mentioned above. In operating the printer, the interpreted output from the host processor 72 is transmitted to the decomposer (not shown) where it is decomposed into graphics and text for printing by the IOT.

According to a preferred embodiment of the present invention, the system of the present invention is manifested as a "super-program" generally residing in disk 76, which, when the host processor 72 is activated to receive a printing job through one of lines 20a, 20b . . . 20n for ultimate relay to a decomposer and then the printer itself, manages the incoming jobs so that host processor 72 will instruct accelerator coprocessor (ACP) 74 to process the job from network 20 in a prescribed way. Disk 76, as described in companion application Attorney Docket No. D/92186, contains a variety of memory maps such as 78-1, each memory map including the software necessary to interpret a given PDL. Thus, the disk 76 will preferably contain enough memory maps to correspond to any PDL which is known to be anywhere on the system. The system of the present invention effectively coordinates the incoming print jobs through network 20 and the various memory maps on the disk 76. The effects of the systems of the present invention are generally apparent within ACP 74.

Viewing the system of the present invention first from the standpoint of a user, a user or administrator on the network (although not necessarily every user on the network) has the option of selecting a "queue cofiguration," or "state," of the line into server 25 he is using. By "queue cofiguration" is meant the properties of that line to retain an input change in PDL or other fundamental parameter. Restricting the present discussion only to the selection of a PDL, a user having all the options available to him can choose among three possible states for his line to the server 25: managed, unmanaged, and sanitary. If the user chooses the line to be "unmanaged," this means that the selected PDL associated with the line will remain on that given line to the server 25 so that any subsequent jobs coming through that line will have to be in that PDL. If a job not of that PDL subsequently comes over that line, there will either be an error, or in some cases the system will be designed to "swap" the previous PDL for a new one from disk 76, in a time-consuming re-booting of the ACP 74. This is the usual state of prior art networked printers, but sometimes this is desirable if it is known that there will be only one type of PDL coming over that particular line, in the interest of convenience.

If the "managed" option is open, the persistency on the line will remain as in the unmanaged case, only if, as part of the diagnostic wherein the line state is chosen, security data such as a correct password is entered, which may be used to effectively change the PDL of that line. Such a managed option may be restricted to system managers, if it is desired that only system managers shall have the power to change the PDL of a given line. If an incorrect password is entered, an error message or a refusal to enter the changing PDL may be sent back to the user.

If the "sanitary" option is chosen, the job is regarded as a "one-shot" from a PDL viewpoint. That is, whatever PDL was associated with the line before the job was sent will be disregarded, the correct PDL for the job will be selected as part of the job, and then the PDL selection for that job will be effectively erased when the job is completed. In short, choosing the sanitary option will both cause the job to ignore any previous state of the line, and itself will have no effect on subsequent jobs sent through the line. The sanitary option thus maximizes the independence of the user and insulates the job from any other job in system 10. The sanitary option may include a feature by which the pre-existing context of the line is temporarily retained elsewhere while the sanitary job is run, and then reestablished after the job is run, as though nothing happened on the line. Conceivably either individual jobs or lines themselves may be considered "sanitary," in the sense that no trace of a sanitary job will remain on a line, or of any job on a sanitary line.

Figure 5A:
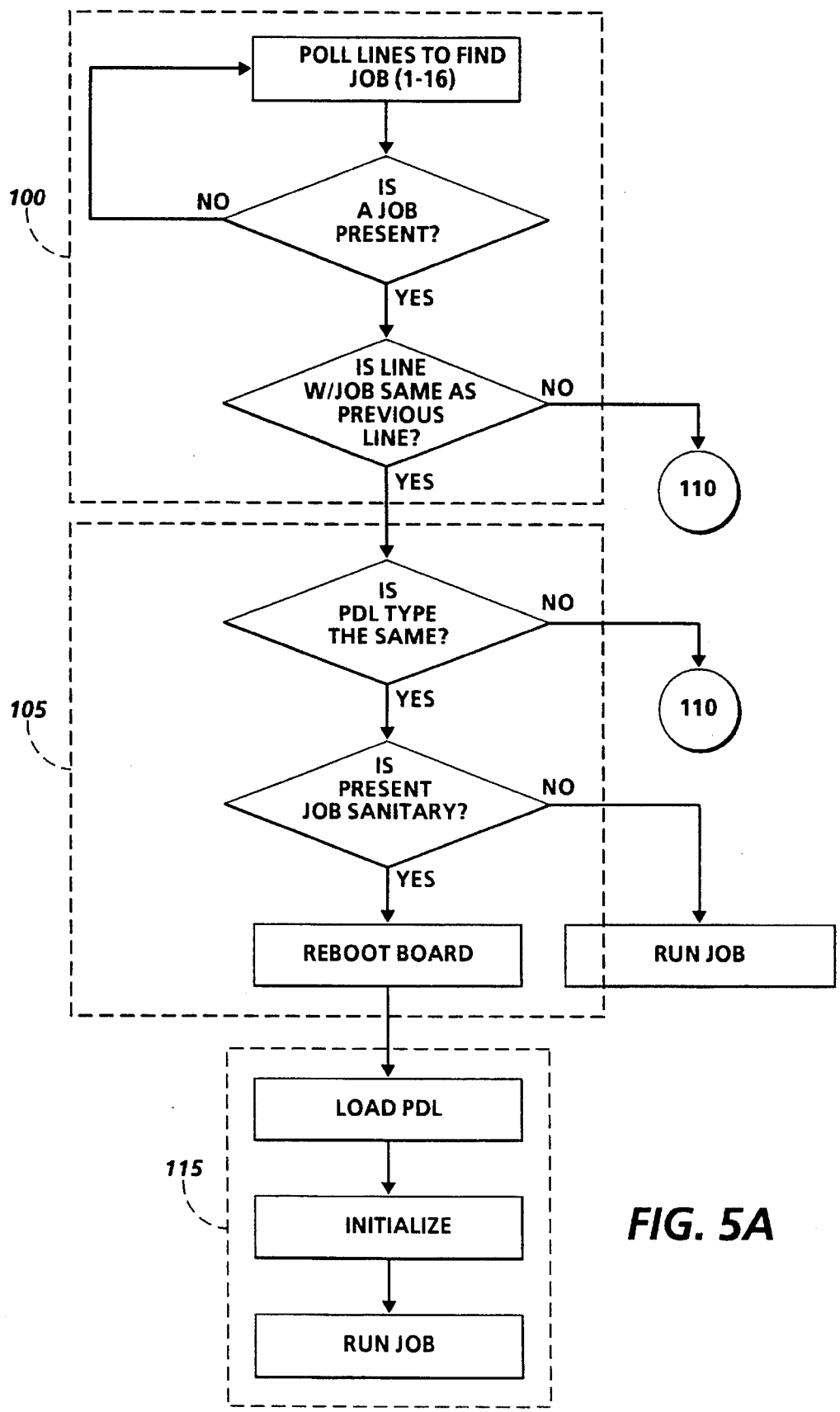
FIGS. 5A–5D are flow diagrams illustrating the preferred routines of controlling the contexts associated with a line, according to the present invention.
Figure 5B:
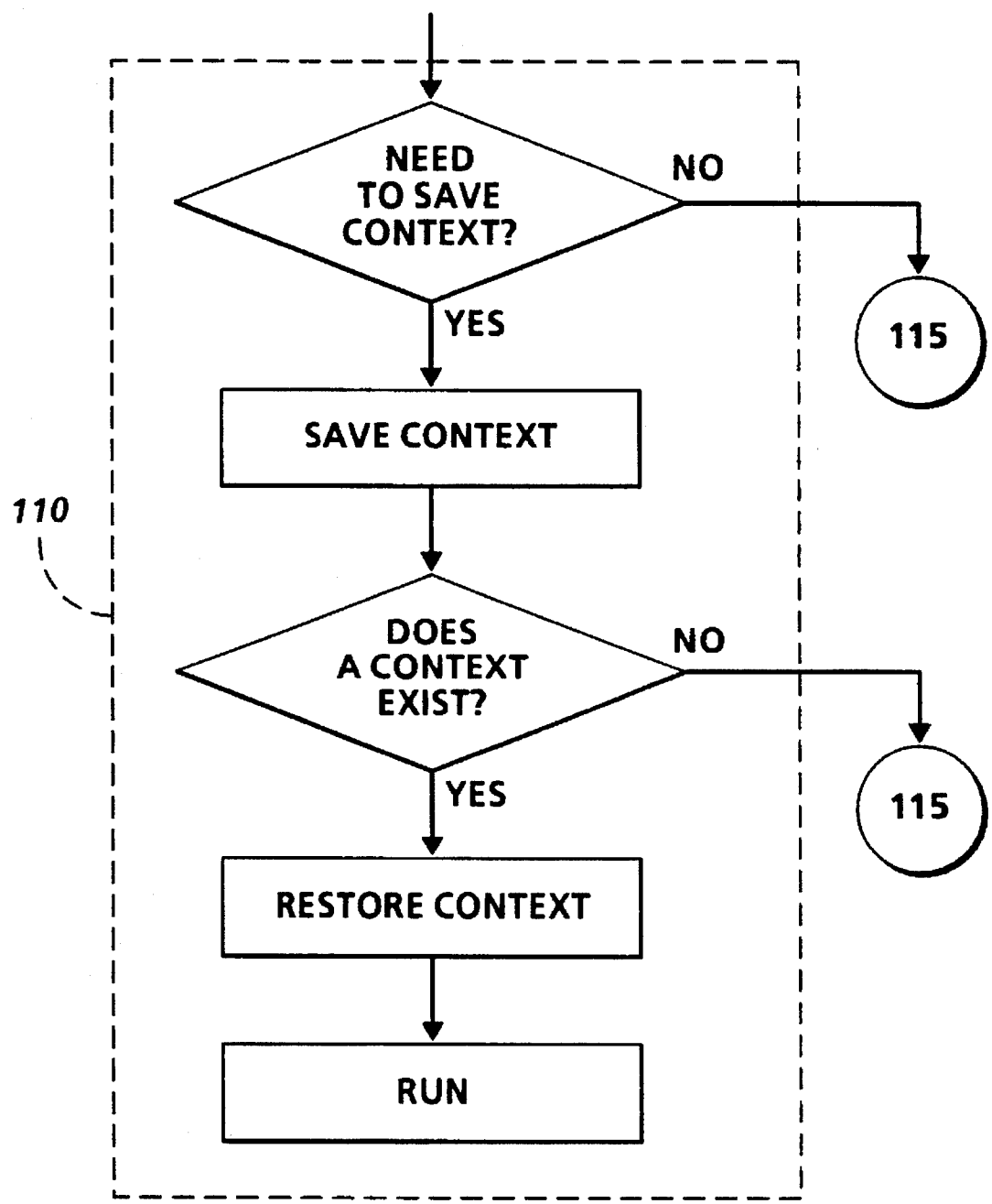

FIGS. 5A and 5B are first and second portions, respectively, of a flow chart illustrating the general functions of the "super-program" generally stored within disk 76 and operating on host processor 72 and accelerator coprocessor 74, according to the present invention. In the Figures, the individual meanings of each instruction and decision in the flow chart is indicated on each item itself, and the present discussion will concentrate on the various stages into which the general function of the system can be divided. At the stage of instructions and decisions generally marked 100, the super-program of the present invention first seeks and prioritizes the various jobs coming in on parallel lines 20 into host processor 72. In one embodiment of the invention intended for commercial release, the network has provision for sixteen such lines 20n. One possible means of selecting jobs from a set of parallel lines is the "round-robin" method well known in the art, in which a set of lines such as 20a, 20b, . . . 20n are polled sequentially in a repeating cycle until a job to be printed is discovered on one line. The system thus polls each line until the polling cycle is interrupted by a job on one line. Once a job to be printed is discovered, the ACP 74 is polled to see if it is available for accepting a new job. If the accelerator coprocessor 74 is busy, the job (hereinafter known as the "present job") is simply queued in known manner within the system until the accelerator coprocessor 74 is idle and ready to accept the present job. Once the accelerator coprocessor 74 becomes idle, it is then ascertained whether the present job is "next in line" in the round-robin polling cycle. Other possible means for selecting and prioritizing various jobs from parallel lines 20a, 20b, . . . 20n will be apparent to one skilled in the art.

Once a job on a given line 20n is accepted for sending to the printer, the appropriate PDL (and, in variations of the present invention, other fundamental parameters such as error flagging), are selected as appropriate for the job. In a general sense, the selection of the correct PDL begins with a reading of the queue configuration of the line in question, based on the PDL of the previous job through that line. Once again, in the "unmanaged" state, which is usually (but not necessarily) the default state of the entire system, the PDL of the line for the present job will merely be the PDL of the line from the previous job (in the following discussion, it is important to make a clear distinction between a "previous job" and the "present job" coming through a line 20n). For purposes of convenience and saving of time, the selected PDL associated with the line will not be changed unless it is instructed to be changed, and therefore it is desirable to check the existing PDL associated with the line. As can be seen in the section of the flow chart generally marked 105, the line on which the present job is entered is "read" for its "context" (which in the basic case is simply the selection of PDL, although other fundamental parameters may be part of the context as well). If it is discovered that the present job is of the same PDL as the line, then the PDL need not be changed, and the only remaining query is whether the job in question is sanitary. If the PDL of the job and the line is the same, and the job is not sanitary, nothing more need be done and the job is simply run according to the line PDL, as shown. If the job is sanitary, then the ACP 74 must be re-booted and loaded with the appropriate PDL from disk 76, and then initialized, before the job is run. Viewing section 105 of the flow chart as a whole, it can be seen that this routine holds for the basic case wherein a series of jobs all of the same PDL are sent to a printer through one line.

Returning to section 100, it will be seen that another possibility is that a new job entering server 25 comes on a line 20a, 20b . . . 20n different from that of the previous job entering the server. This case calls into action the routine indicated generally as section 110. In general, section 110 is concerned with matching the new (present) job with its appropriate PDL and, if so selected, retaining that PDL on that particular line 20a, 20b . . . 20n for use next time a job comes through on that particular line. The first query in section 110 is whether the context of the line 20a, 20b . . . 20n as used in the previous job need be retained, which is the same as asking if the previous job run in the system was sanitary. If the previous job was not sanitary or on a sanitary line, then the context of the previous job is saved for future use the next time the line of the previous job is used. The next query is whether a context is already associated with the line of the present job. If yes, the PDL already associated with that line is activated and the job is run.

Looking at the "no" alternatives of both queries in section 110, if either the context of the line of the previous job need not be saved, or if no context already exists on the line for the present job, a new PDL must be called from the disk 76 to allow translation of the job by ACP 74. The necessary routine of re-booting ACP 74, loading the appropriate PDL into ACP 74, initializing the program, and running the job, is shown in the section generally marked 115. The steps of re-booting the ACP 74 and initializing the system are essential to the process, because the re-booting essentially "flushes" the ACP 74 so that the persistence effects of any other previous job on any line are erased. On a "sanitary" line, this re-booting or "flushing" will occur at every job; on a "managed" or "unmanaged" line, this re-booting will occur whenever the line or PDL of a job is different from that of the previous job coming through the system.

Figure 5C:
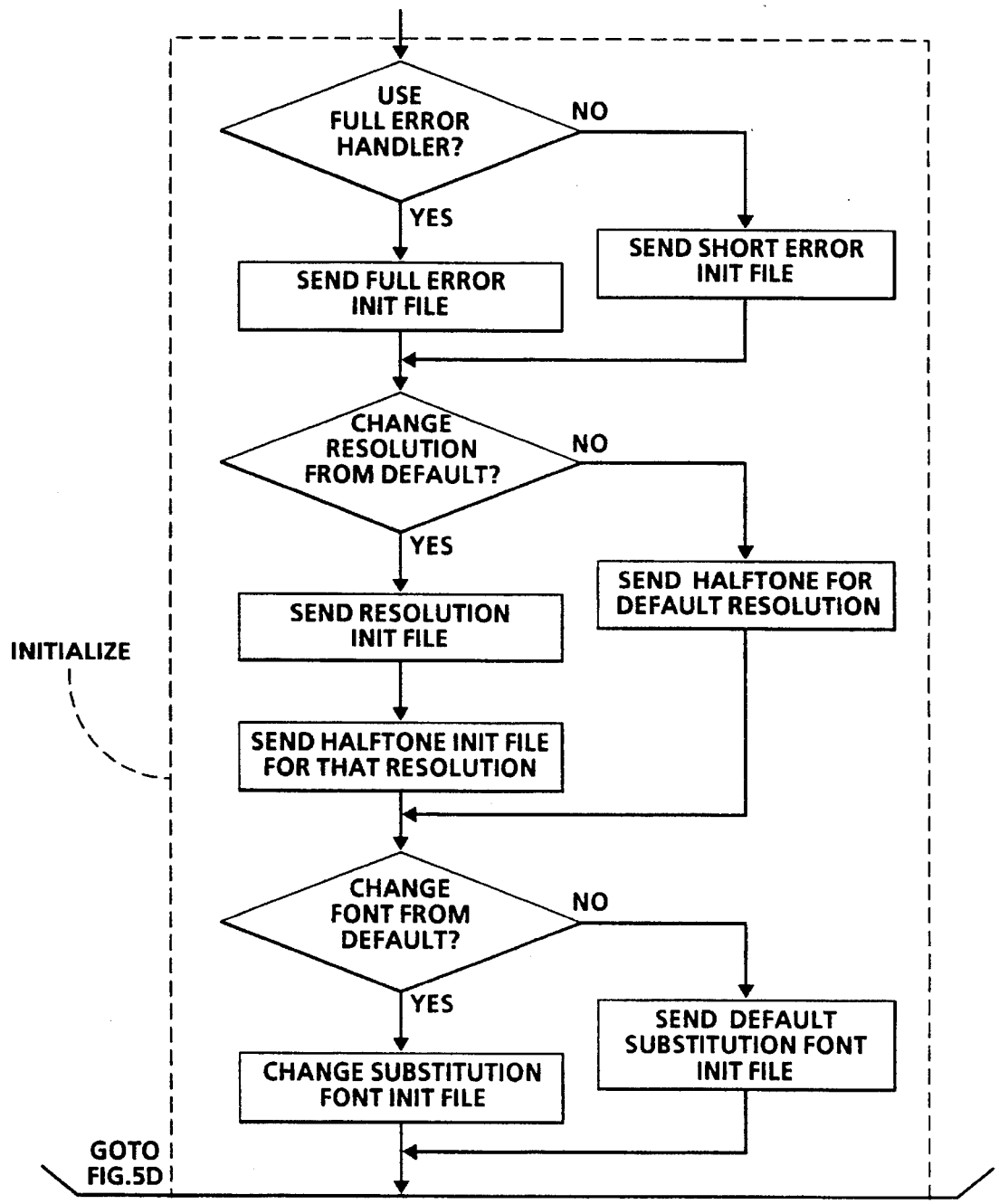
Figure 5D:
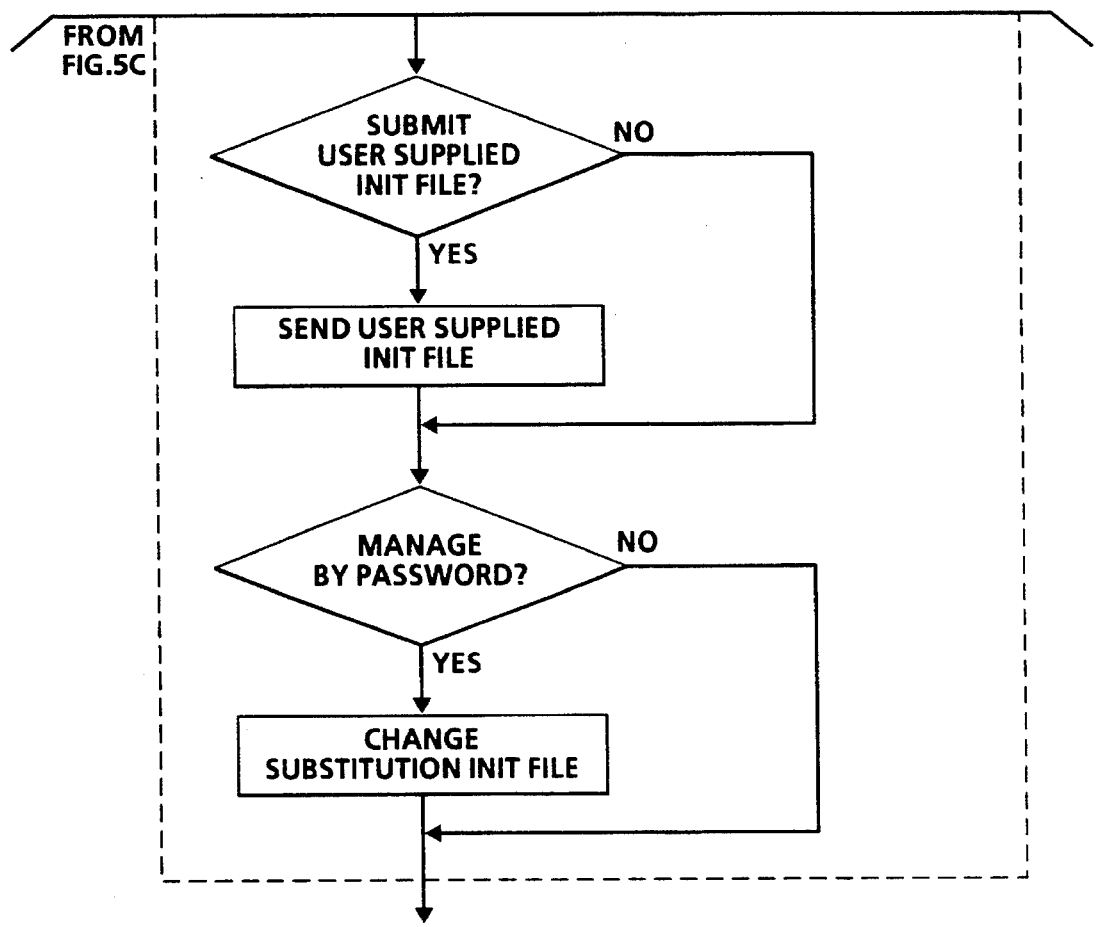

Prefatory to running a job in any case in the above flow chart wherein the ACP 74 must be re-booted or a new PDL loaded from the disk 76 into ACP 74, it will be noticed that an "initialization" step is always necessary. FIGS. 5C and 5D show a detailed flow chart illustrating the steps within the initialization step. It is in this initialization step that certain additional program parameters, besides the selection of PDL, are made, namely, the use of a default or alternate error flagging system; the use of a default or alternate printing resolution; or the use of a default or alternate substitute font. FIG. 5C illustrates how such choices are acted upon at every initialization step. Selections based on user preferences, in the form of an additional user- or administrator-supplied initialization file, for these parameters may be entered into the system either with the diagnostic wherein each user chooses the queue configuration, or conceivably as part of job ticket when an individual job is run.

Another user selection which is shown in the last query in FIG. 5D is whether the initialization step shall be "managed by password." As mentioned above, the only fundamental difference between the "managed" and "unmanaged" states for the lines of the present invention is that, in a "managed" state, the changing of a persistency for a given line may be accomplished only by the entry of security data, such as a password, when the change in PDL is desired or authorized if such a change is necessary. In the "unmanaged" state, any user may change the PDL of his line at any time. Use of the "managed" state may be useful if, for example, only a system manager within a company shall be authorized to allow PDL changes. In the preferred embodiment of the present invention, the "gate" which may be lowered for required a password is preferably activated in the initialization step, which is prefatory to any change of PDL.

While the present invention has been described in connection with a preferred embodiment thereof, it will be understood that it is not intended to limit the invention to that embodiment. On the contrary, it is intended to cover all alternatives, modifications and equivalents as may be included within the spirit and scope of the invention as defined by the appended claims.

What is claimed is:

1. A system for transferring printing jobs comprising digital image data from a user through a line to an electronic printer for execution therein, the line having associated therewith a context comprising a program parameter relating to processing of the digital image data by the printer, comprising:

processor means operatively associated with the line for translating a printing job having a preselected context into a form understandable by the electronic printer, having associated therewith a set of selectable memory maps, each memory map having a sequence of instructions to translate a printing job;

persistency means, associated with the line, for retaining the context of a printing job transferred through the line and causing the processor means to translate a subsequent printing job passing through the line according to the retained context; and state selection means, associated with the line, for preventing the persistency means associated with the line from retaining the context of a printing job after the processor means translates the printing job;

the state selection means being sensitive to a "sanitary job" instruction included as part of a printing job, the state selection means preventing the persistency means associated with the line from retaining the context of a printing job having a "sanitary job" instruction associated therewith, the state selection means being adapted to reboot the processor means in response to the "sanitary job" instruction.

2. A system as in claim 1, wherein the program parameter includes a routine relating to a page description language.

3. A system as in claim 1, wherein the program parameter includes a programming error routine.

4. A system as in claim 1, wherein the program parameter includes a font substitution routine.

5. A system as in claim 1, wherein the program parameter includes a routine sent from the user of the line.

6. A system as in claim 1, further comprising:

a plurality of lines operatively associated with the processor means; and means for selecting one of the plurality of lines for selection of a desired job.

7. A system as in claim 6, wherein the selecting means further includes means for polling each of the plurality of lines cyclically until a printing job is found on one line.

8. A system as in claim 1, wherein the state selection means includes selectable program instructions.

9. A system as in claim 8, wherein the state selection means includes security means whereby the selectable program instructions require entry of security data in order to modify operations of at least a portion of the selectable program instructions.

10. A system as in claim 9, wherein the state selection means includes security means whereby the selectable program instructions require entry of security data in order to cause the persistency means associated with the line to retain the context of a printing job after the processor means translates the printing job.

11. A method of transferring printing jobs comprising digital image data from a user through a line to an electronic printer for execution therein, the line having associated therewith a context relating to processing of the digital image data by the printer, comprising the steps of:

a processor translating a printing job having a preselected context into a form understandable by the electronic printer;

retaining the context of the printing job transferred through the line and translating a subsequent printing job passing through the line according to the retained context; and in response to a "sanitary job" instruction associated with a printing job, preventing retaining the context of the printing job after translating the printing job, and rebooting the processor before translating a subsequent printing job.

* * * * *